US011182493B2

(12) United States Patent
Mebed

(10) Patent No.: US 11,182,493 B2
(45) Date of Patent: Nov. 23, 2021

(54) INFORMATION PRIVACY SYSTEM AND METHOD

(71) Applicant: Microsoft Technology Licensing, LLC, Redmond, WA (US)

(72) Inventor: Amr Mohamed Mebed, Giza (EG)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 274 days.

(21) Appl. No.: 16/423,689

(22) Filed: May 28, 2019

(65) Prior Publication Data

US 2019/0294808 A1    Sep. 26, 2019

Related U.S. Application Data

(60) Division of application No. 14/884,580, filed on Oct. 15, 2015, now abandoned, which is a continuation of
(Continued)

(51) Int. Cl.
*G06F 21/62* (2013.01)
*G06F 21/31* (2013.01)
(Continued)

(52) U.S. Cl.
CPC .............. *G06F 21/62* (2013.01); *G06F 21/00* (2013.01); *G06F 21/10* (2013.01); *G06F 21/31* (2013.01);
(Continued)

(58) Field of Classification Search
CPC ........ G06F 21/554; G06F 21/88; G06F 21/66; G06F 21/35; G06F 21/40; G06F 21/6245; G06F 21/10; G06F 21/31; G06F 21/00
See application file for complete search history.

(56) References Cited

U.S. PATENT DOCUMENTS 7,603,435 B2 * 10/2009 Welingkar .............. H04W 4/00
                                                    709/217
10,824,741 B1 * 11/2020 Porter .................... G06F 21/604
(Continued)

OTHER PUBLICATIONS

Singh, "Online Data Backup and Disaster Recovery Techniques in cloud computing: A Review", Retrieved From https://www.researchgate.net/publication/268079118, Published Nov. 2012. (Year: 2012).*

Primary Examiner — Chau Le
(74) Attorney, Agent, or Firm — Fiala & Weaver P.L.L.C.

(57) ABSTRACT

The subject disclosure relates to systems and methods for providing privacy for information. In one non-limiting embodiment, a system includes an environment monitoring component configured to monitor an aspect of an environment; and a privacy component configured to: determine whether factors associated with the environment are triggered; and obscure access or provide access to data or a program associated with the factors based on determining that the factors are triggered. Factors can be based on the time and the location or network connectivity of a device associated with the system, the detected presence or absence of an authorized person other than the user logged into the device or the privacy state of the user logged into the device. Motion detectors, cameras, biometric sensors and other devices can be employed in the determination of whether to provide or obscure access to the information.

20 Claims, 10 Drawing Sheets

Related U.S. Application Data application No. 13/052,437, filed on Mar. 21, 2011, now Pat. No. 9,189,606.

(51) Int. Cl.
*G06F 21/10* (2013.01)
*G06F 21/35* (2013.01)
*G06F 21/40* (2013.01)
*G06F 21/00* (2013.01)

(52) U.S. Cl.
CPC .............. *G06F 21/35* (2013.01); *G06F 21/40* (2013.01); *G06F 21/6245* (2013.01); *G06F 2221/2111* (2013.01)

(56) References Cited

U.S. PATENT DOCUMENTS

| | | | |
|---|---|---|---|
| 2006/0014532 A1* | 1/2006 | Seligmann | H04W 12/08 455/420 |
| 2009/0295534 A1* | 12/2009 | Golander | H04Q 9/00 340/5.2 |
| 2010/0250497 A1* | 9/2010 | Redlich | H04L 63/0227 707/661 |
| 2011/0320819 A1* | 12/2011 | Weber | H04L 9/0825 713/176 |
| 2012/0197090 A1* | 8/2012 | Chen | A61B 5/14532 600/301 |

\* cited by examiner

300

310

Associating at least one of data, a program or a device with an availability of an authorized person, wherein the authorized person is other than a user logged into a device attempting to access the at least one of the data or the program

320

Determining whether the authorized person is available

330

Providing access to or unlocking the data, the program or the device based on the determining that the authorized person is available

FIG. 3

INFORMATION PRIVACY SYSTEM AND METHOD

CROSS-REFERENCE TO RELATED APPLICATIONS

The present application is a divisional of U.S. application Ser. No. 14/884,580, entitled "INFORMATION PRIVACY SYSTEM AND METHOD," filed Oct. 15, 2015, which is a continuation of U.S. Pat. No. 9,189,606, entitled "INFORMATION PRIVACY SYSTEM AND METHOD," filed on Mar. 21, 2011, each of which are incorporated by reference herein in their entirety.

TECHNICAL FIELD

The subject disclosure generally relates to systems and methods for providing information privacy.

BACKGROUND

Conventional devices and systems typically employ mere password protection to permit or prevent access to data, programs and/or devices accessible by or stored on a device. In cases in which the password protection is bypassed or determined, unauthorized access to sensitive information can be obtained. Additionally, in cases in which the device is properly accessed by an authorized user but signals to and from the device are intercepted, the possibility for unauthorized access to sensitive data, programs and/or devices is again present. However, access to all data, programs and/or devices stored on or accessible by a device is not necessary in all environments. For example, during certain times of day, or when the device is in certain locations, etc., selected data, programs and/or devices need not be accessed.

The above-described background information and deficiencies of current systems are merely intended to provide an overview of some of the background information and problems of conventional systems and methods that employ privacy techniques, and are not intended to be exhaustive. The above-described deficiencies of today's systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

Various embodiments as provided herein are targeted to environments having mobile or stationary electronic devices configured to store or access data, programs and/or devices. Information privacy systems and methods can be utilized with such devices to enhance the privacy of information stored on or accessible by the devices.

In one non-limiting embodiment, for example, an information privacy system can include an environment monitoring component configured to monitor an aspect of an environment, and a privacy component configured to receive information from the environment monitoring component about the monitored environment, and determine whether one or more factors associated with the environment are triggered. Access to data, programs and/or devices can be provided or prevented based on whether the factors are triggered. Factors include, but are not limited to, time, location of the device, whether motion of third-parties is detected near the device and/or whether an authorized person is present near the device (or connected to a designated network). Accordingly, cameras, motion sensors, biometric sensors, global positioning system (GPS) sensors and the like can be employed to facilitate such systems.

In another non-limiting embodiment, a method of enhancing privacy can be performed. The method can include associating specific data, or a program, with an availability of an authorized person. The authorized person is specified and stored on the device or in another location accessible by the device. The authorized person is someone other than the user logged into the device and, for example, can include, but is not limited to, an administrator, super user, member of management or the like. A determination can be made as to whether the authorized person is available and, if so, access to particular data, programs or devices can be provided. In some non-limiting embodiments, the determination is made by scanning for a signal, such as a beacon signal, associated with a device owned by the authorized person, such as a BLUETOOTH® device signal.

In yet another non-limiting embodiment, a computer-readable storage medium stores computer-executable instructions that, when executed on a computing device, cause the computing device to perform various operations. The operations can include, in one non-limiting embodiment, associating particular data, a program or device with a privacy state of an authorized person, such as a user logged into the device. The privacy state is determined according to whether other third-parties are detected in proximity to the device of the authorized person. Access to the associated data or program is then obscured or granted based on whether third-parties are detected.

These and other non-limiting embodiments are described in more detail below.

BRIEF DESCRIPTION OF THE DRAWINGS

Various non-limiting embodiments are further described with reference to the accompanying drawings in which:

FIG. 3 is a flow diagram illustrating an exemplary non-limiting process for an information privacy system;

DETAILED DESCRIPTION

Information Privacy

It is to be appreciated that the non-limiting embodiments provided herein are not intended to be limited to any information privacy system or environment implementation, unless explicitly stated otherwise. Further, unless stated otherwise, the hereto appended claims are not intended to be limited to the claimed information privacy systems or methods.

By way of further description with respect to one or more non-limiting aspects of information privacy systems and methods, such systems and methods are disclosed that can permit or prevent access to data, programs and/or devices based on a number of factors, considered solely or jointly. By way of examples, but not limitation, factors can include time or location of a device configured with the information privacy system, whether an authorized person other than the user of the device is within a particular proximity of the user or logged onto a designated network and/or whether motion of a third-party is detected within proximity of a user. For instance, based on such environmental feedback, a computing device could initiate hiding of a hard disk, e.g., from the device list, once an unauthorized person enters a room (this is not just hiding data or a program, but a device or other underlying hardware or firmware).

In some non-limiting embodiments, for example, systems including an environment monitoring component and privacy component are provided. The environment monitoring component is configured to monitor an aspect of an environment near the device, while the privacy component is configured to determine whether pre-defined factors are met based on the monitored environment, and generate information to permit or prevent access based on such determination. In some non-limiting embodiments, privacy states of a user can be used to permit or prevent access to data, programs and/or devices. In still other non-limiting embodiments, the presence or absence of an authorized person can be used to permit or prevent access to data, programs and/or devices.

Figure 1:
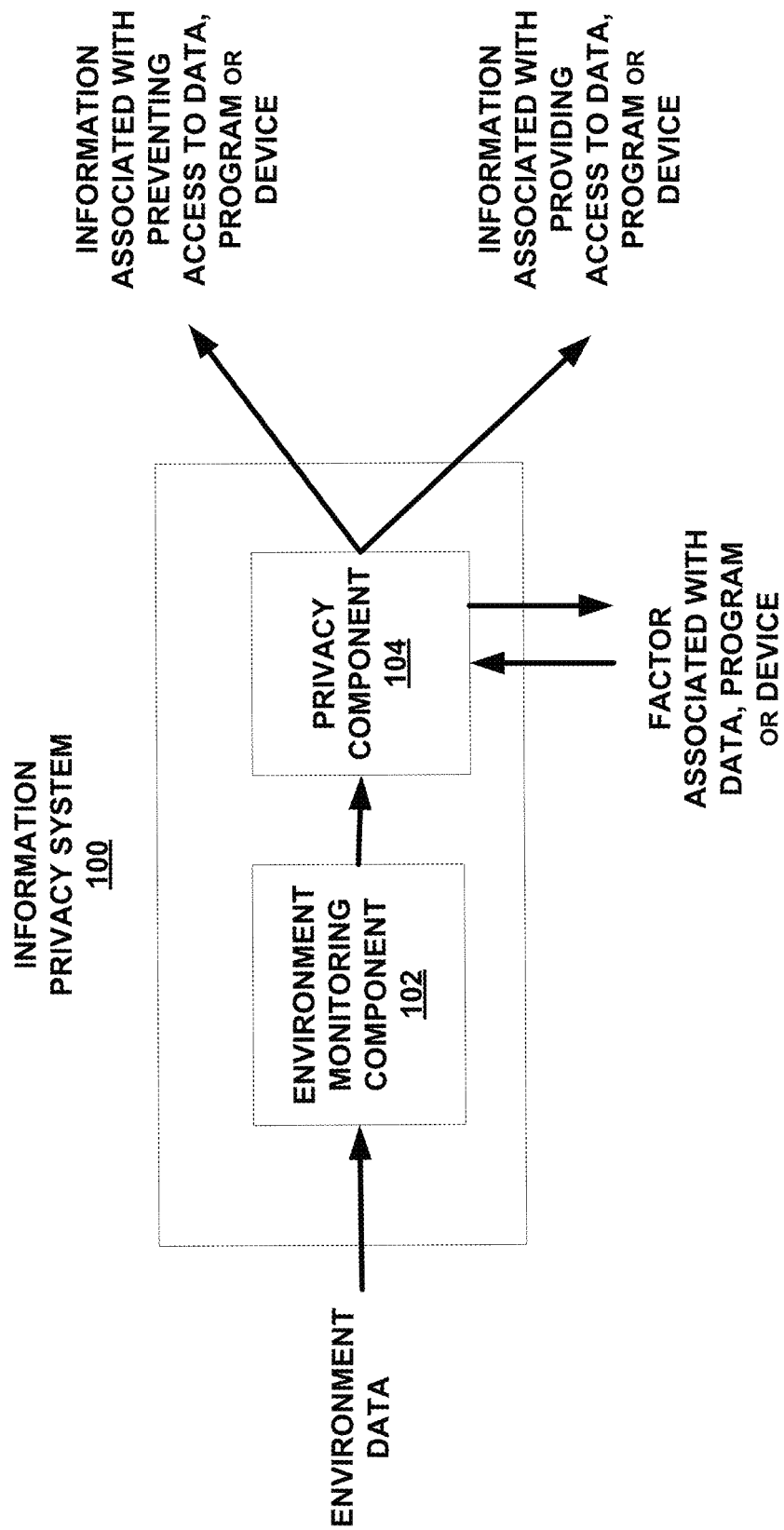
FIG. 1 is a block diagram showing an exemplary non-limiting implementation of an information privacy system in accordance with one or more non-limiting embodiments.

By way of further description, FIG. 1 is a block diagram showing an exemplary non-limiting implementation of an information privacy system 100 in accordance with one or more non-limiting embodiments. The information privacy system 100 can include an environment monitoring component 102 configured to monitor an aspect of an environment.

As shown, environmental data (e.g., time, motion, identity of persons in nearby proximity to device, etc.) can be sensed at the environment monitoring component 102. Various aspects of an environment can be monitored. For example, time, event, location, a number of persons in a room with a particular user of a device employing information privacy, an identity of persons in a room with a particular user of a device employing information privacy or any number of other aspects of the environment can be determined and employed in providing information privacy.

The environment monitoring component 102 can monitor for temperature, heat, gas, nuclear radiation, e.g., in this case computers are automatically alerted for fire (or other detectable emergency), and thus automatically hide or take steps to protect the confidential data (upload to a cloud storage).

In numerous non-limiting embodiments, more than one factor can be substantially concurrently or simultaneously associated with particular data, programs or devices. As such, more than one factor or aspect of the environment can be determined prior to determining whether to obscure or make available the associated data, programs and/or devices.

While data, programs and/or devices are described herein as being associated with factors indicative of aspects of the environments, the data, programs and/or devices can include, but are not limited to, files, video, text, graphics, audio data, programming software, system software and application software and the like. In various non-limiting embodiments, any number of different types of data can be manipulated, including, but not limited to, passwords, login information, financial information, and other types of sensitive data. In non-limiting embodiments, devices that can utilize the information privacy systems and methods described can be mobile or stationary electronic devices including, but not limited to, personal computers, laptops, mobile phones, personal digital assistants (PDAs) or the like.

Turning to particular aspects for exemplary purposes, in some non-limiting embodiments, time can be employed in providing information privacy. For example, data, programs and/or devices can be associated with time. Accordingly, at specific time periods or at specific points in time, data is made available (decrypted, placed on the device or otherwise made available) and/or programs are unlocked and available to the user of the device. At other time periods or times, data is obscured (deleted, hidden, encrypted) and/or programs are locked or removed. The time periods or times can be specified explicitly (e.g., 5-7 pm Eastern European Time) or implicitly (e.g., sunrise).

One aspect of the environment can include an event associated with time at a location on earth relative to a location on another celestial body, such as another planet. By way of example, but not limitation, the event can be at least one of a sunrise or a sunset at the location on earth at which the device is located. For example, in some non-limiting embodiments, data, programs and/or devices can be associated with a device location and a planet location. As such, the association can be an association with device location and planet location, e.g., an association of device location and planet location for a common time. In one non-limiting embodiment, for example, certain data, programs and/or devices can be made accessible by the information privacy system at sunrise each day. A determination of whether sunrise is occurring or has occurred can be based on the particular device location relative to the location of a second planet, the Sun.

In various non-limiting embodiments generally, data, programs or devices can be associated with the location of a designated person (who is other than the user of the device employing information privacy). For example, BLUETOOTH® technology can be employed to determine whether a signal from a second device (e.g., the device of the designated person) is within a certain proximity to the user of the device employing information privacy. The information privacy system can provide access to the data or the programs only when the designated person is within the proximity identified and/or otherwise determined to be available. For example, the designated person can be determined to be available when a BLUETOOTH® device for the designated person is switched on, and the signal is received by the device employing information privacy (indicating that the designating person is within 10 meters, for example, of the device). By contrast, when a signal of a BLUETOOTH® device of a non-designated person is received by the device employing information privacy, or the BLUETOOTH® device of the designated person is turned off, data can be obscured (encrypted, hidden, deleted from the device) or programs can be locked or removed.

In some non-limiting embodiments, global positioning system (GPS), triangulation, an equation to calculate the location of a different planet from the planet on which the device is located, local area network information (e.g., wireless LAN), BLUETOOTH® technology, or any system or method that provides location information for a device can be employed.

In some embodiments, a determined location could be designated as secure so data, programs and/or devices are made private and/or a location can be designated as non-private so data, programs and/or devices are not made private. In cases in which data, programs and/or devices are not made private, data, programs and/or devices can be open and/or accessible for the user of the device and/or anyone in proximity of the device in some cases, to read the data and/or access the programs.

Turning back to FIG. 1, the information privacy system 100 can also include a privacy component 104. The privacy component 104 can receive information from the environment monitoring component 102 indicative of the sensed environment and determine whether one or more factors associated with the environment are triggered.

As shown in FIG. 1, the factors (such as information shown in FIG. 2) can be dynamically accessed by the privacy component 104, or the factors can be stored at the privacy component 104 and/or information privacy system 100 of the device generally.

The privacy component 104 can determine whether factors are met and obscure or provide access according to the manner in which the factor is specified. For example, the factor can be specified such that if the factor is met, access is provided. As another example, the factor can be specified such that if the factor is met, access is prevented.

The privacy component 104 can generate information associated with preventing or providing the access as shown in FIG. 1. The information generated can include passwords or other commands indicating that access is to be provided (or prevented) in various non-limiting embodiments.

Accordingly, the privacy component 104 can obscure or provide access to data, a program or a device associated with the one or more factors. Obscuring can be performed in a number of different ways including, but not limited to, deleting, hiding, encrypting and/or otherwise making data unintelligible. In some non-limiting embodiments, the data can be encrypted with an encryption key that is not accessible by the device or a user of the device, thereby preventing the device from displaying clear text and/or from accessing the data. In some non-limiting embodiments, the data can be deleted from (or hidden at) the device and a copy of the data can be stored in a location to which the device does not have access. For example, the data can be stored at a cloud location to which the device does not have access.

In some non-limiting embodiments, data is moved off of the device and data is not restored to the device again until factors indicate that the data should be accessible again. For example, data can be moved from a device upon movement of the device to or outside of a particular location or network, and restored back on the device upon movement of the device inside of the particular location or network. For example, in some non-limiting embodiments, access to data, programs and/or devices can be provided to a software developer while the developer is working on a device that is on-site at a company location, and access can be prevented when the developer takes the device off-site. Such methods can be employed to potentially limit the proliferation of misappropriation of sensitive data that may occur if/when a developer leaves or resigns from a company. In some non-limiting embodiments, a copy of the data could be moved to a cloud and retrieved from the cloud upon movement of the device back inside of a particular location or network.

Factors can include a device associated with the information privacy system being disconnected from a designated network, a location of a device associated with the information privacy system being outside of a designated area or a presence or absence of a designated person. For example, whether the device is located in a particular geographic location or outside from or otherwise disconnected from a particular network can be factors. If a determination is made that the device is located in a particular geographic location or outside from or otherwise disconnected from a particular network, access to particular data can be obscured or denied and/or programs can be locked or removed such that the device is unable to access the program. As such, in various non-limiting embodiments, sensitive data (e.g., contacts data, financial data, passwords, corporate confidential data, the name or address associated with the device and the like) can be made inaccessible in the event of device theft or when the device is taken to a region of the world or country in which access to certain types of data is not required or the like. The user of the device and/or an administrator of a device can associate the data, programs and/or devices with the one or more factors that will cause data to be obscured or to be provided access.

In various non-limiting embodiments, a factor can be the presence or absence (or network connectivity or lack of network connectivity) of an authorized person. For example, access to data, programs or devices can be provided if an authorized person is present within a selected distance of a user logged onto the device. As such, the systems and methods herein can limit the access of a user to data, programs or devices to times during which an authorized person is working with the user and is therefore nearby (or connected to a particular network). Similarly, programs can be unlocked or otherwise unprotected during these time periods. The authorized person can be detected in any number of ways including, but not limited to, via the use of cameras and image recognition, voice recognition, motion processing, biometric (e.g., fingertip, retina/iris) sensors, passwords associated with the authorized person or the like.

In some non-limiting embodiments, the privacy component is configured to provide access to at least one of data, a program or a device based, at least, on determining that a designated person is detected within a selected distance of a device associated with the information privacy system according to a detection process. By way of example, but not limitation, the designated person is other than a user logged into the device associated with the information privacy system.

In some non-limiting embodiments, the privacy component is configured to obscure access to at least one of data, a program or a device based, at least, on determining that a non-designated person is detected within a selected distance of a device associated with the information privacy system.

In some non-limiting embodiments, the environment monitoring component comprises at least one of a camera, a motion sensor, a biometrics sensor, a fingerprint sensor, a sensor configured to determine whether an associated with the information privacy system is communicatively coupled to a selected network or a GPS sensor. In some non-limiting embodiments, the environment monitoring component is configured to detect the non-designated person utilizing at least one of a camera, a motion sensor, a biometrics sensor or a fingerprint sensor. Sensor information can also come from any of a variety of type of sensors, such as a Body Area Network (BAN), Wireless Body Area Network (WBAN) or Body sensor network (BSN). In this regard, it is to be understood that user data and location data, and other types of data may require the consent of a given user or set of users, and thus all embodiments herein optionally contemplate a step of receiving explicit or implicit consent for use of such user data and location data, in satisfaction of privacy principles that may be implicated for a given use.

Figure 2:
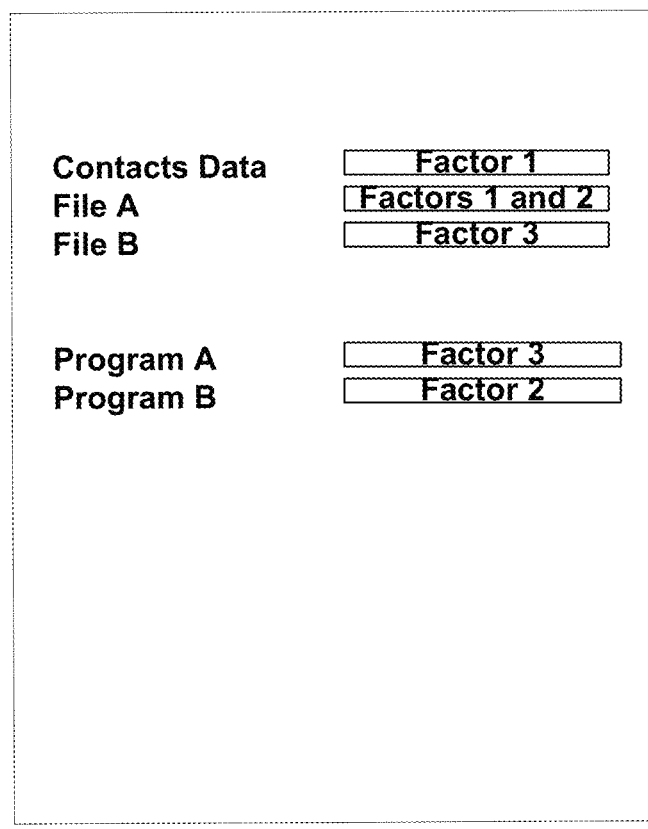
FIG. 2 is a block diagram showing an exemplary non-limiting implementation of stored information for facilitating the information privacy system.

FIG. 2 is a block diagram showing an exemplary non-limiting implementation of stored information for facilitating the information privacy system. The information can be stored on the device, at a particular location within the network accessible by the device and/or stored on a server. In some non-limiting embodiments, the server can be a cloud server.

As shown in FIG. 2, contacts data, files A and B, and/or programs A and B are associated with one or more different factors. For example, with regard to contacts data, one or more contacts (or groups of contacts) can be associated with a location. The location can be specified as a GPS location, cell identification (ID) or the like. If the device moves outside of a particular location, the contacts or groups of contacts can be automatically deleted, hidden or removed from the device. If the device returns to the particular location, the contact or groups of contacts can be automatically restored to the device again. In some non-limiting embodiments, a server (e.g., replication server) can restore the contacts or group of contacts at the next replication.

While contacts data is described, any number of different types of data can be manipulated, including, but not limited to, passwords, login information, financial information, and other types of sensitive data. In some non-limiting embodiments, factors indicative of privacy properties can be indicated as metadata for a file for which privacy is provided and/or stored in a table that points to the metadata or to factors (such as that shown in FIG. 2).

When the factors are determined to be true based on the environment, the contacts data, files, and/or programs are obscured or access to the data, files and/or programs is provided, depending on the specification associated with the factor. As such, the factors can specify conditions that, when met, access is provided to the data, programs and/or devices associated with the factors. In other non-limiting embodiments, depending on the system designer for the information privacy system (and/or the settings set by the user of the device), the factors can specify conditions that, when met, access is not provided to the data, programs and/or devices associated with the factors.

FIG. 3 is a flow diagram illustrating an exemplary non-limiting process for enhancing information privacy. At 310, the process 300 includes associating at least one of data, a program or a device with an availability of an authorized person. In some non-limiting embodiments, a user is logged into a device attempting to access the data or program, and the authorized person is a person other than the user.

At 320, the process 300 includes determining whether the authorized person is available. At 330, the process 300 includes providing access to the data or unlocking the program based on determining that the authorized person is available. Providing access to the data or the program can include storing the data at a network location accessible by the device attempting to access the data, decrypting the data, unlocking the program or maintaining the program in an unlocked state.

Determining whether the authorized person is available can include determining that a radio signal is emitted from a device associated with the authorized person in some non-limiting embodiments. In other non-limiting embodiments, determining whether the authorized person is available comprises determining that the authorized person is accessing a designated network concurrently with the determining device attempting to access the data or the program.

Figure 4:
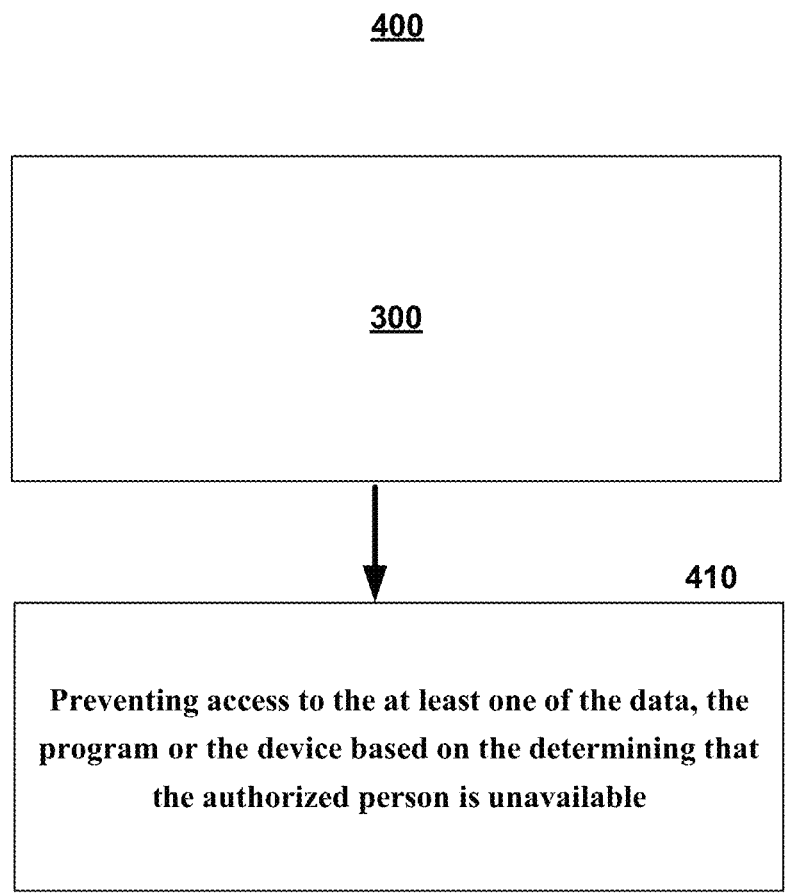
FIG. 4 is a flow diagram illustrating an exemplary non-limiting process for an information privacy system.

FIG. 4 is a flow diagram illustrating an exemplary non-limiting process for enhancing information privacy. FIG. 4 can include the process 300 of FIG. 3. In addition, in some embodiments, a process 400 can also include, at 410, preventing access to the data or the program based on determining that the authorized person is unavailable. In some non-limiting embodiments, preventing access to the data or the program includes deleting or hiding the data, storing the data at a network location inaccessible by the device attempting to access the data, encrypting the data, locking the program, maintaining the program in a locked state or removing the program.

Figure 5:
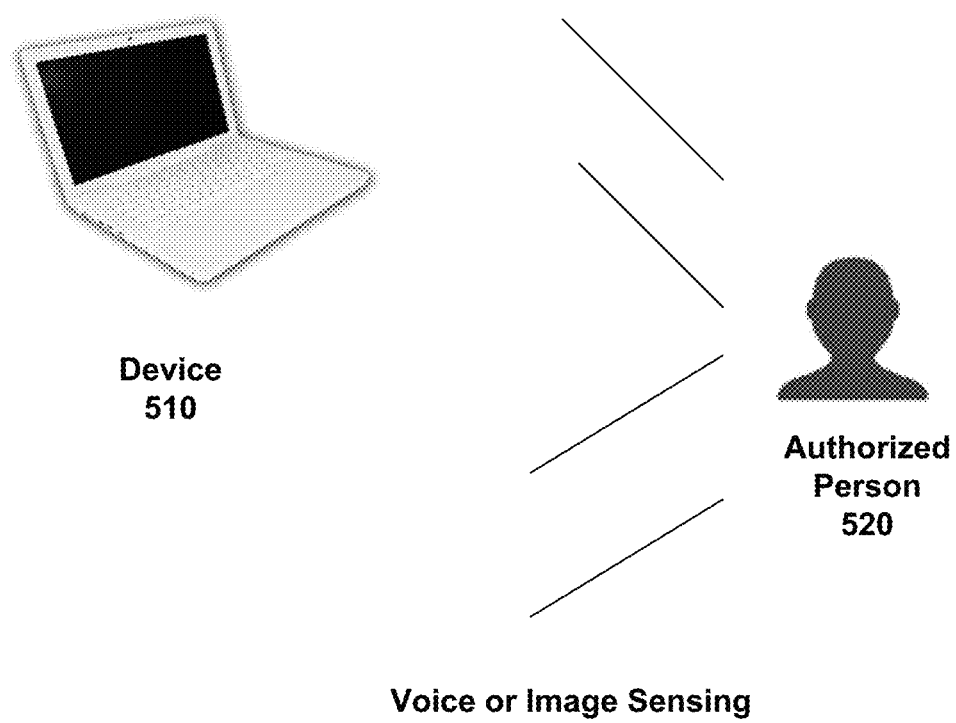
FIG. 5 is a block diagram showing an exemplary non-limiting implementation for an information privacy system.

FIG. 5 is a block diagram showing an exemplary non-limiting implementation for an information privacy system. As shown in FIG. 5, a device 510 configured with information privacy enhancement can determine whether an authorized person 520 is within a selected proximity of the device by scanning the environment surrounding the user of the device 510 for the authorized person (or a device typically accompanying the authorized person, e.g., the BLUETOOTH® device of the authorized person) or by determining which users are currently logged onto a particular network. If the device 510 configured with the information privacy enhancement detects that the authorized person 520 is within the selected proximity or logged on, access to data, programs and/or devices can be permitted. On the contrary, if the device 510 configured with the information privacy enhancement fails to detect that the authorized person 520 is within the selected proximity or logged on, access to data, programs and/or devices can be prevented.

In some non-limiting embodiments, data, programs and/or devices can be associated with a number of persons in a room. The number of persons can be indicative of the privacy state of a user of a device employing information privacy. For example, certain data, programs or devices can be indicated as those that are accessible only when the user of the device is alone (and a determination is made that no other persons are in the room with the user or within a particular proximity to the user).

The number of persons can be sensed via motion or video (or audio) sensors or determined by camera. When the sensors or camera detect that the user is alone in the room (or no other users are within a particular proximity to the user), then data is decrypted, programs are unlocked and data, programs and/or devices are available to the user to use. By contrast, when more than one person (or a person other than the user) is detected, then the associated data, programs and/or devices are made unavailable. Accordingly, the user of the device can be limited to work on sensitive data, programs and/or devices only when authorized persons are present or logged on. Such can facilitate administrative level oversight to work performed on selected data and/or within selected programs.

Figure 6:
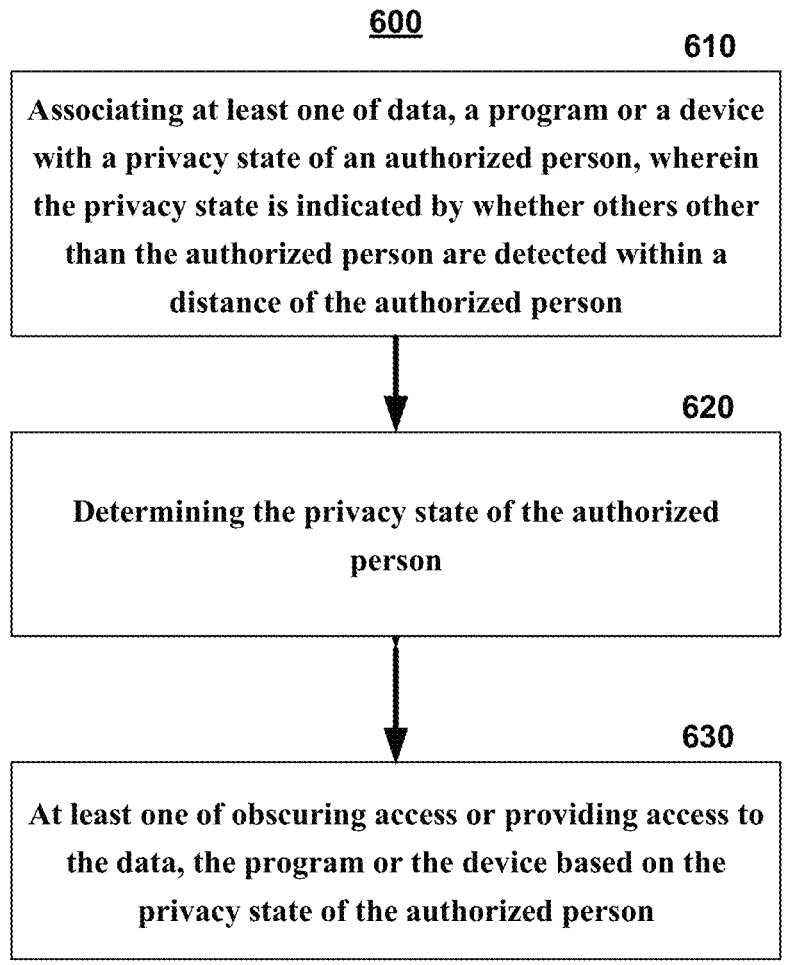
FIG. 6 is a flow diagram illustrating an exemplary non-limiting process for an information privacy system.

FIG. 6 is a flow diagram illustrating an exemplary non-limiting process for enhancing information privacy based on a privacy state of a user of a device employing information privacy. At 610, the process 600 can include associating data, a program or a device with a privacy state of an authorized person. The privacy state can be indicated by whether others other than the authorized person are detected within a distance of the authorized person.

At 620, the process 600 can include determining the privacy state of the authorized person. At 630, the process 600 can include obscuring access or providing access to the data or program based on the privacy state of the authorized person.

In some non-limiting embodiments, a user can work in a room and one or more persons can walk into the room and/or a designated proximity to the user. The information privacy system can automatically protect the data.

Figure 7:
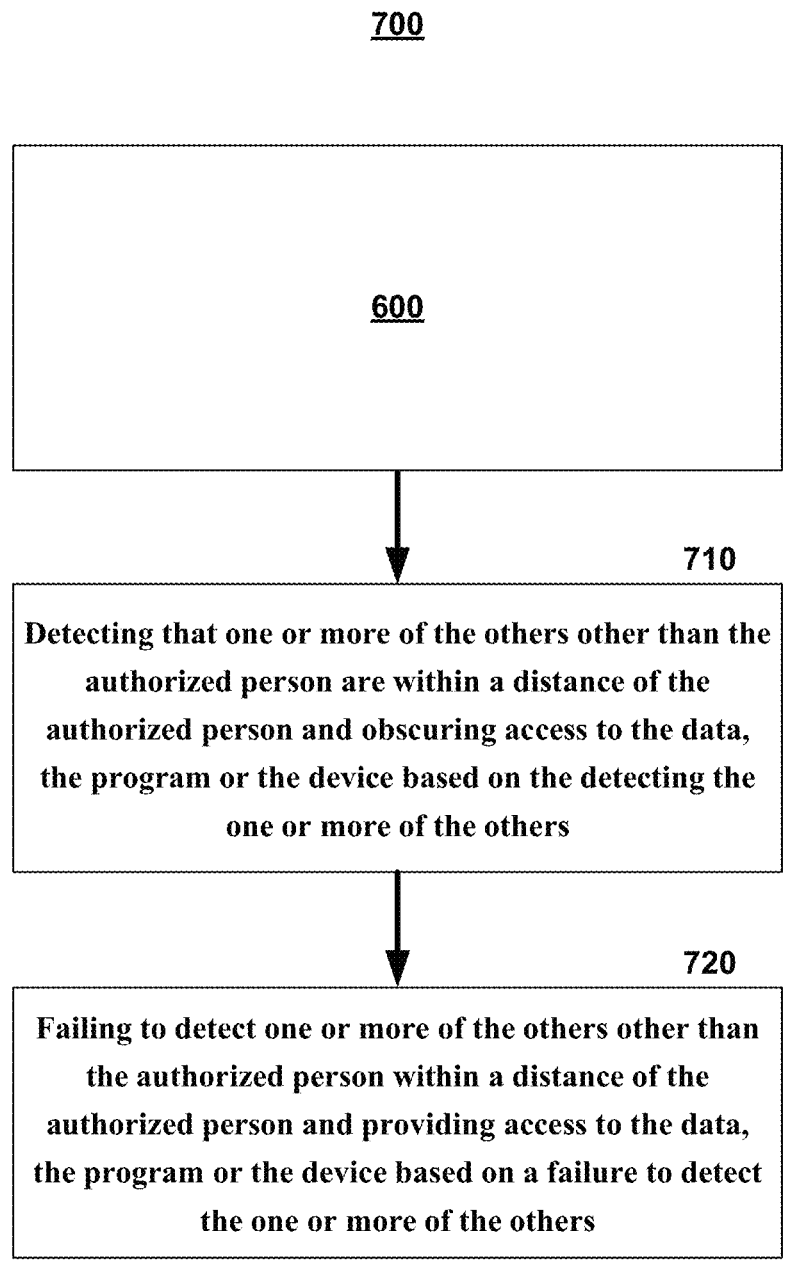
FIG. 7 is a flow diagram illustrating an exemplary non-limiting process for an information privacy system.

FIG. 7 is a flow diagram illustrating an exemplary non-limiting process for enhancing information privacy. FIG. 7 can include the process 600 of FIG. 6. In addition, in some embodiments, a process 700 can include, at step 710, detecting that one or more of the others other than the authorized person are within a distance of the authorized person and obscuring access to the data or program based on the detecting the one or more of the others. At step 720, the process 700 can include failing to detect one or more of the others other than the authorized person within a distance of the authorized person and providing access to the data or program based on a failure to detect the one or more of the others. Detecting can be performed utilizing a motion sensor or camera to detect whether anyone is within a particular distance of the authorized person.

Figure 8:
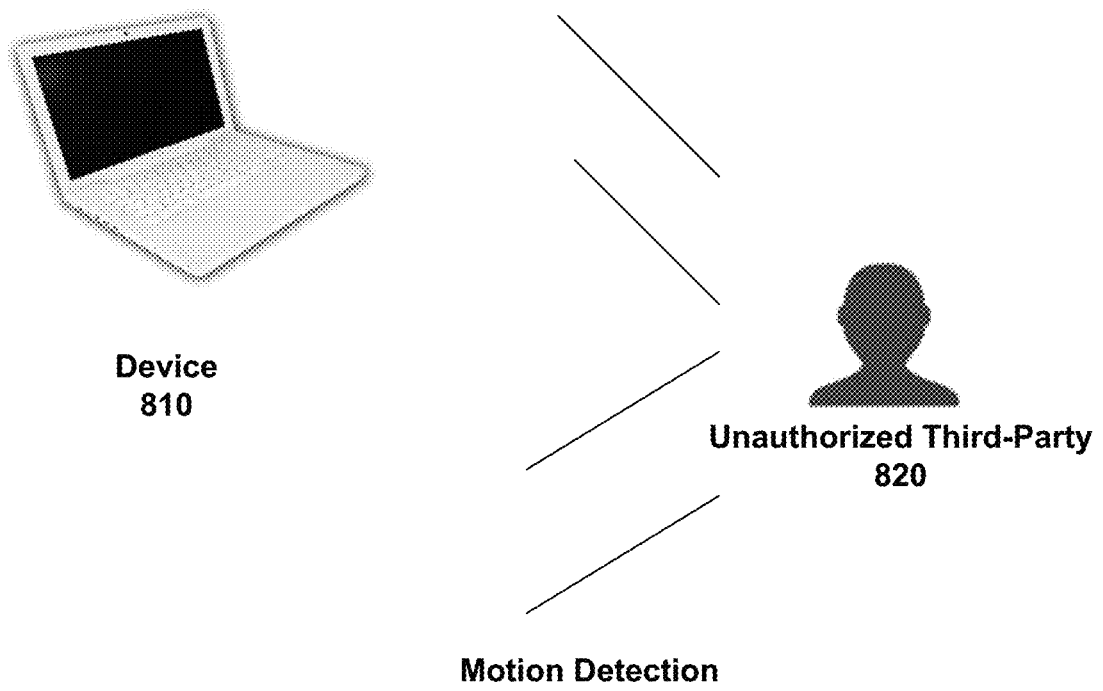
FIG. 8 is a block diagram showing an exemplary non-limiting implementation of an information privacy system.

FIG. 8 is a block diagram showing an exemplary non-limiting implementation for an information privacy system. As shown in FIG. 8, a device 810 configured with information privacy enhancement can determine whether any third-parties 820 are within a selected proximity of the device or whether the user is alone in a room or other designated geographical area. The device 810 can make such determination in some non-limiting embodiments by scanning the environment surrounding the user of the device 810 for motion. If the device 810 configured with the information privacy enhancement fails to detect motion that is not associated with the user of the device 810, access to data, programs and/or devices can be permitted. On the contrary, if the device 810 configured with the information privacy enhancement detects motion that is not associated with the user of the device 810 (e.g., motion of a third-party 820), access to data, programs and/or devices can be prevented. In such cases, a user can work on particular sensitive data, programs and/or devices when the user is alone and/or if a device storing sensitive data, programs and/or devices is stolen, access to the data, programs and/or devices can be prevented.

As mentioned, access to data can be regulated based on various environmental factors discussed in one or more embodiments above. In this regard, data can represent any kind of information, and so all examples of the types of data that exist cannot practically be enumerated, however, it is to be noted that all types and formats of data are contemplated for application of the techniques described herein. For instance, one type of data is video content, such as a film. In this regard, for a few sample scenarios, based on a film rating, the content may or may not be appropriate for viewing depending on the people within viewing distance. In this case, the action could be: hiding the film, encrypting or otherwise denying access to the film. If the film is in the middle of being viewed, it can be "paused" to illustrate that other types of actions can be taken based on the triggering event. For another example, a dad is watching an action film and his small daughter wakes up in the middle of the night and enters the living room. In such case, the computing device could automatically detect this and pause the film, and, e.g., automatically resume when the condition has cleared.

In various non-limiting embodiments, cameras/image processing and/or motion processing can be employed to determine the presence or motion, respectively, of persons other than the user. Other technology can also be employed including, but not limited to, cooperation between the device and a wireless network operator to inform the device that a wireless device associated with the network operator is within a particular proximity to the device configured with the information privacy enhancement. In some non-limiting embodiments, microphones or voice recognition software could be used to detect that voices from third-parties are in the area of the device or voice signatures could be used to figure out whether a detected voice is associated with a user of the device configured with information privacy enhancement.

Exemplary Networked and Distributed Environments

One of ordinary skill in the art can appreciate that the various non-limiting embodiments of the information privacy systems and methods described herein can be implemented in connection with any computer or other client or server device, which can be deployed as part of a computer network or in a distributed computing environment, and can be connected to any kind of data store. In this regard, the various non-limiting embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the data privacy mechanisms as described for various non-limiting embodiments of the subject disclosure.

Figure 9:
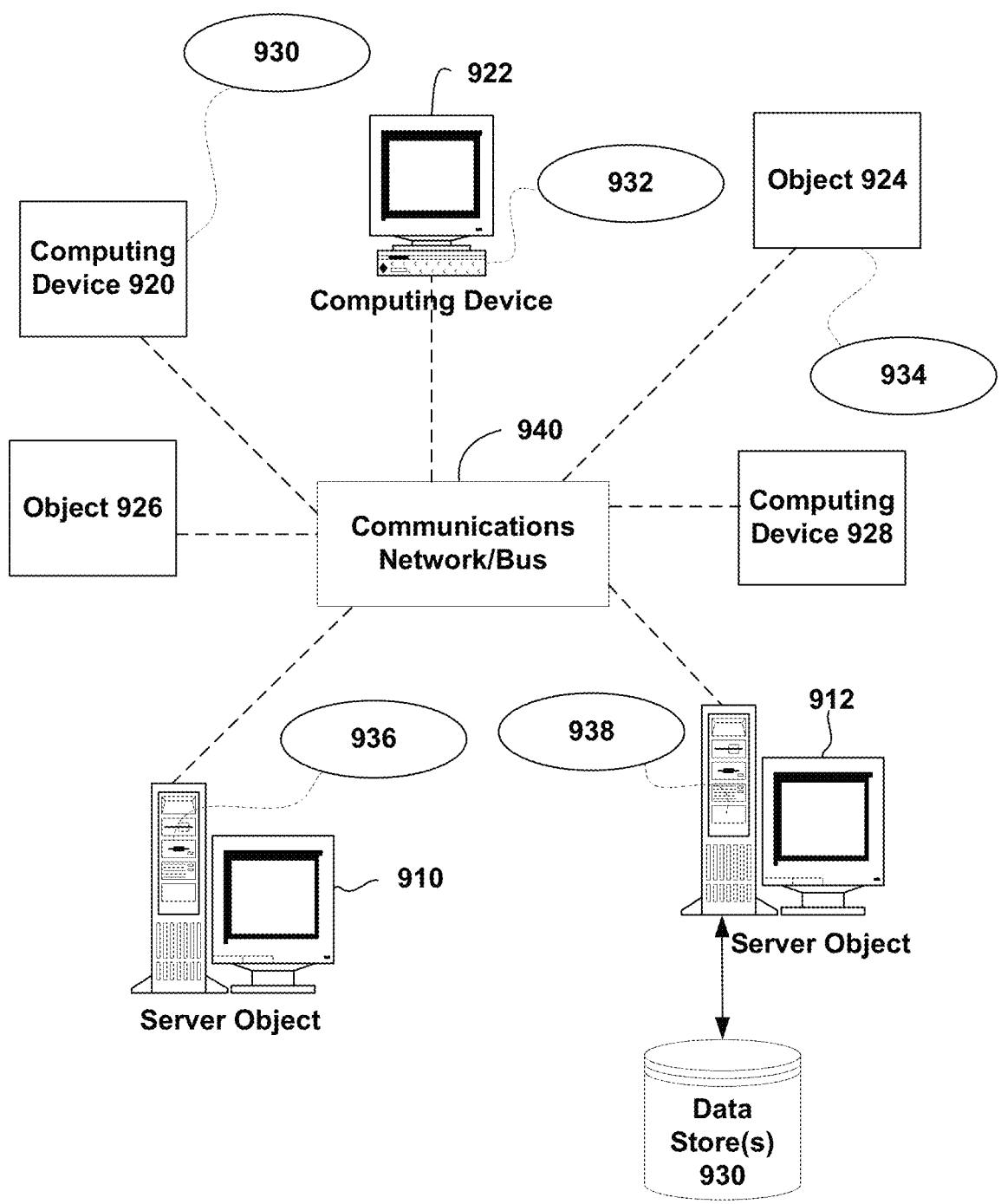
FIG. 9 is a block diagram representing exemplary non-limiting networked environments in which various non-limiting embodiments described herein can be implemented.

FIG. 9 provides a schematic diagram of an exemplary networked or distributed computing environment. The distributed computing environment comprises computing objects 910, 912, etc. and computing objects or devices 920, 922, 924, 926, 928, etc., which may include programs, methods, data stores, programmable logic, etc., as represented by applications 930, 932, 934, 936, 938. It can be appreciated that computing objects 910, 912, etc. and computing objects or devices 920, 922, 924, 926, 928, etc. may comprise different devices, such as personal digital assistants (PDAs), audio/video devices, mobile phones, MP3 players, personal computers, laptops, etc.

Each computing object 910, 912, etc. and computing objects or devices 920, 922, 924, 926, 928, etc. can communicate with one or more other computing objects 910, 912, etc. and computing objects or devices 920, 922, 924, 926, 928, etc. by way of the communications network 940, either directly or indirectly. Even though illustrated as a single element in FIG. 9, communications network 940 may comprise other computing objects and computing devices that provide services to the system of FIG. 9, and/or may represent multiple interconnected networks, which are not shown. Each computing object 910, 912, etc. or computing object or device 920, 922, 924, 926, 928, etc. can also contain an application, such as applications 930, 932, 934, 936, 938, that might make use of an API, or other object, software, firmware and/or hardware, suitable for communication with or implementation of the data privacy provided in accordance with various non-limiting embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the serializable snapshot isolation systems as described in various non-limiting embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In client/server architecture, particularly a networked system, a client is usually a computer that accesses shared network resources provided by another computer, e.g., a server. In the illustration of FIG. 9, as a non-limiting example, computing objects or devices 920, 922, 924, 926, 928, etc. can be thought of as clients and computing objects 910, 912, etc. can be thought of as servers where computing objects 910, 912, etc., acting as servers provide data services, such as receiving data from client computing objects or devices 920, 922, 924, 926, 928, etc., storing of data, processing of data, transmitting data to client computing objects or devices 920, 922, 924, 926, 928, etc., although any computer can be considered a client, a server, or both, depending on the circumstances. Any of these computing devices may be processing data, or requesting services or tasks that may implicate the data privacy techniques as described herein for one or more non-limiting embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 940 or bus is the Internet, for example, the computing objects 910, 912, etc. can be Web servers with which other computing objects or devices 920, 922, 924, 926, 928, etc. communicate via any of a number of known protocols, such as the hypertext transfer protocol (HTTP). Computing objects 910, 912, etc. acting as servers may also serve as clients, e.g., computing objects or devices 920, 922, 924, 926, 928, etc., as may be characteristic of a distributed computing environment.

Exemplary Computing Device

As mentioned, advantageously, the techniques described herein can be applied to any device where it is desirable to facilitate information privacy. It is to be understood, therefore, that handheld, portable and other computing devices and computing objects of all kinds are contemplated for use in connection with the various non-limiting embodiments, i.e., anywhere that a device may wish to have control over privacy. Accordingly, the below general purpose remote computer described below in FIG. 10 is but one example of a computing device.

Although not required, non-limiting embodiments can partly be implemented via an operating system, for use by a developer of services for a device or object, and/or included within application software that operates to perform one or more functional aspects of the various non-limiting embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 10:
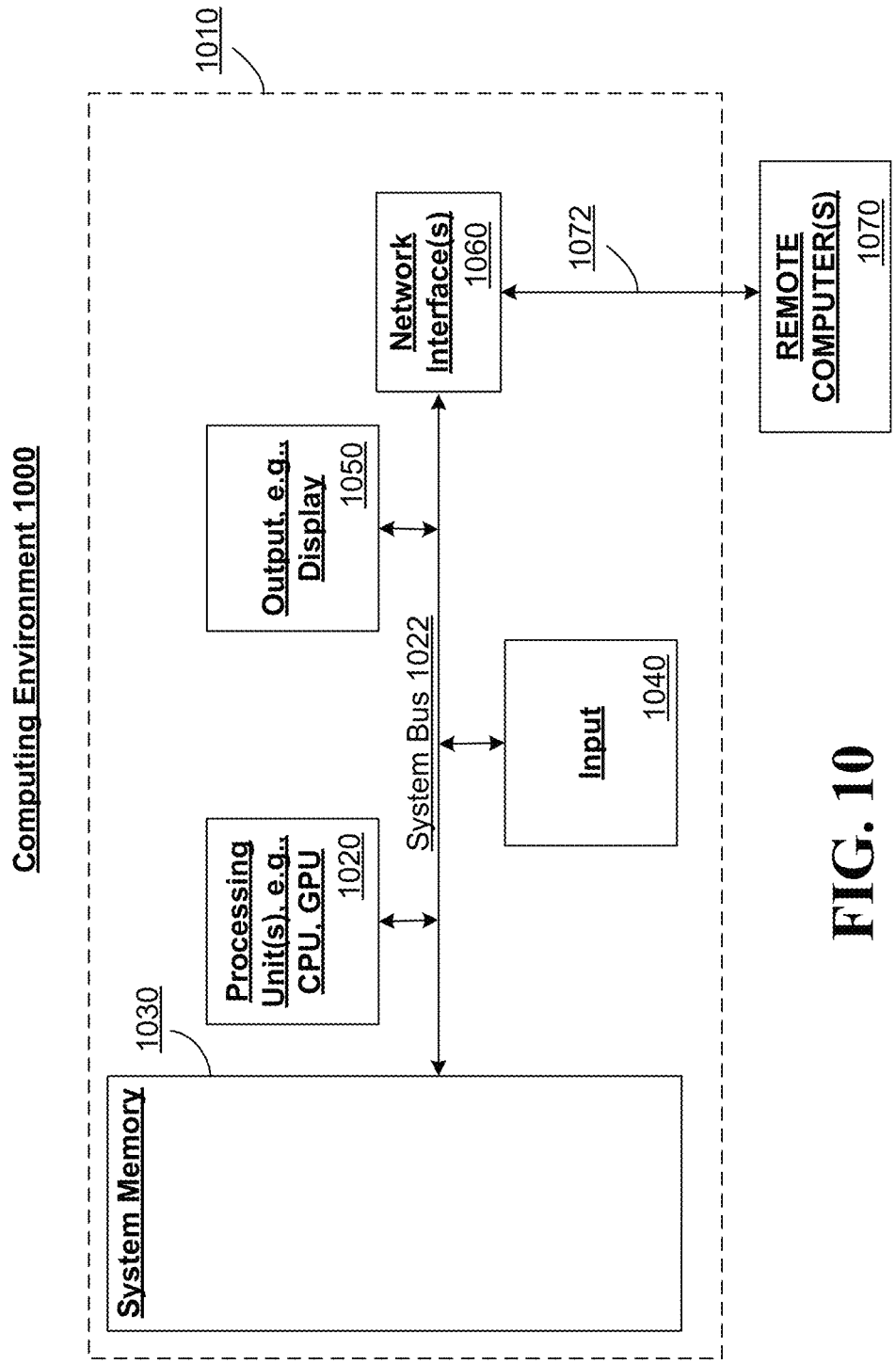
FIG. 10 is a block diagram representing an exemplary non-limiting computing system or operating environment in which one or more aspects of various non-limiting embodiments described herein can be implemented.

FIG. 10 thus illustrates an example of a suitable computing system environment 1000 in which one or aspects of the non-limiting embodiments described herein can be implemented, although as made clear above, the computing system environment 1000 is only one example of a suitable computing environment and is not intended to suggest any limitation as to scope of use or functionality. Neither should the computing system environment 1000 be interpreted as having any dependency or requirement relating to any one or combination of components illustrated in the exemplary computing system environment 1000.

With reference to FIG. 10, an exemplary remote device for implementing one or more non-limiting embodiments includes a general purpose computing device in the form of a computer 1010. Components of computer 1010 may include, but are not limited to, a processing unit 1020, a system memory 1030, and a system bus 1022 that couples various system components including the system memory to the processing unit 1020.

Computer 1010 typically includes a variety of computer readable media and can be any available media that can be accessed by computer 1010. The system memory 1030 may include computer storage media in the form of volatile and/or nonvolatile memory such as read only memory (ROM) and/or random access memory (RAM). Computer readable media can also include, but is not limited to, magnetic storage devices (e.g., hard disk, floppy disk, magnetic strip), optical disks (e.g., compact disk (CD), digital versatile disk (DVD)), smart cards, and/or flash memory devices (e.g., card, stick, key drive). By way of example, and not limitation, system memory 1030 may also include an operating system, application programs, other program modules, and program data.

A user can enter commands and information into the computer 1010 through input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such local area network (LAN) or a wide area network (WAN), but may also include other networks/buses. Such networking environments are commonplace in homes, offices, enterprise-wide computer networks, intranets and the Internet.

As mentioned above, while exemplary non-limiting embodiments have been described in connection with various computing devices and network architectures, the underlying concepts may be applied to any network system and any computing device or system.

Also, there are multiple ways to implement the same or similar functionality, e.g., an appropriate application programming interface (API), tool kit, driver source code, operating system, control, standalone or downloadable software object, etc. which enables applications and services to take advantage of techniques provided herein. Thus, non-limiting embodiments herein are contemplated from the standpoint of an API (or other software object), as well as from a software or hardware object that implements one or more aspects of the data privacy techniques described herein. Thus, various non-limiting embodiments described herein can have aspects that are wholly in hardware, partly in hardware and partly in software, as well as in software.

Various exemplary embodiments will now be enumerated. In one exemplary embodiment, an information privacy system is provided that comprises an environment monitoring component configured to monitor an aspect of an environment, and a privacy component that is configured to determine whether one or more factors associated with the environment are triggered, and at least one of obscure access or provide access to at least one of data, a program or a device associated with the one or more factors based on a determination that the one or more factors are triggered.

In the information privacy system, the environment monitoring component comprises at least one of a camera, a motion sensor, a biometrics sensor, a fingerprint sensor, a body area network, a wireless body area network, a body sensor network, or a sensor configured to determine whether a device associated with the information privacy system is communicatively coupled to a selected network or a global positioning system sensor.

In the information privacy system, the aspect comprises an event associated with time at a location on Earth at which a device associated with the information privacy system is located relative to a location on another celestial body.

In the information privacy system, the event is at least one of sunrise or sunset.

In the information privacy system, the one or more factors comprise at least one of a first computing device associated with the information privacy system being disconnected from a designated network, a location of the first computing device associated with the information privacy system being outside of a designated area, or a presence or absence of a second computing device associated with a designated person.

In the information privacy system, the privacy component is configured to provide access to the at least one of the data, the program or the device based on a detection that the second computing device associated with the designated person is within a selected distance of a device associated with the information privacy system. In an embodiment, the designated person is other than a user logged into the device associated with the information privacy system. In an embodiment, the environment monitoring component is configured to detect the designated person utilizing at least one of a camera, a motion sensor, a biometrics sensor, a fingerprint sensor or a sensor configured to scan for devices transmitting a designated beacon signal. In an embodiment, the environment monitoring component is configured to detect the device associated with the designated person utilizing a sensor configured to scan for the devices transmitting the designated beacon signal.

In the information privacy system, the privacy component is configured to obscure access to the at least one of the data, the program or the device based on a detection that a third computing device associated with a non-designated person is within a selected distance of the first computing device associated with the information privacy system. In an embodiment, the environment monitoring component is configured to detect the third computing device associated with the non-designated person utilizing a sensor configured to scan for the devices transmitting the designated beacon signal.

In another exemplary embodiment, a method of enhancing privacy is provided that comprises executing on a computing device, instructions that, when executed, cause the computing device to perform operations. The operations comprise associating at least one of data, a program or a device with an availability of an authorized person, wherein the authorized person is other than a user logged into a computing device attempting to access the at least one of the data, the program or the device, determining that the authorized person is available, and providing access to or unlocking the data, the program or the device based on the determining that the authorized person is available.

In the method, the determining that the authorized person is available comprises determining that a radio signal is emitted from the computing device associated with the authorized person.

In the method, the determining that the authorized person is available comprises determining that the authorized person is accessing a designated network substantially concurrently with the computing device attempting to access the at least one of the data, the program or the device.

In the method, the providing access to the at least one of the data, the program or the device comprises at least one of storing the data at a network location accessible by the device attempting to access the data, decrypting the data, unlocking the program or the device, or maintaining the program or the device in an unlocked state.

The method may further comprise preventing access to the at least one of the data, the program or the device based on the determining that the authorized person is unavailable.

In the method, the preventing access to the at least one of the data, the program or the device comprises at least one of deleting the data, hiding the data, storing the data at a network location inaccessible by the device attempting to access the data, encrypting the data, locking the program or the device, or maintaining the program or the device in a locked state.

In still another exemplary embodiment, a computer-readable storage medium storing computer-executable instructions that, in response to execution by a computing device, cause the computing device to perform operations is provided. The operations comprise associating at least one of data, a program or a device with a privacy state of an authorized person, wherein the privacy state is indicated by whether others other than the authorized person are detected within a distance of the authorized person, determining the privacy state of the authorized person, and at least one of obscuring or providing access to the data, the program or the device based on the privacy state of the authorized person.

The operations may further comprise detecting that an other of the others other than the authorized person is within a distance of the authorized person and obscuring access to the data, the program or the device based on the detecting the other, and failing to detect the other within the distance of the authorized person and providing access to the data, the program or the device based on the failing to detect the other. In an embodiment, the detecting comprises utilizing a motion sensor or camera.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. For another example, one or more embodiments can be implemented according to a computer-readable storage medium storing computer-executable instructions that, in response to execution by a computing device, cause the computing device to perform operations.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various non-limiting embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various non-limiting embodiments described herein, it is to be understood that other similar non-limiting embodiments can be used or modifications and additions can be made to the described non-limiting embodiment(s) for performing the same or equivalent function of the corresponding non-limiting embodiment(s) without deviating therefrom. Still further, multiple processing chips or multiple devices can share the performance of one or more functions described herein, and similarly, storage can be effected across a plurality of devices. Accordingly, the invention should not be limited to any single non-limiting embodiment, but rather is to be construed in breadth, spirit and scope in accordance with the appended claims.

What is claimed is:

1. An information privacy system, comprising:
   a processing unit;
   a memory comprising software, the software including instructions to cause the processing unit to perform the actions of:
      monitoring a presence of one or more parties with respect to a computing device in an environment;
      determining that at least one of the one or more parties present in the environment is not designated to access data stored in the computing device; and
      in response to determining that the at least one of the one or more parties present in the environment is not designated to access the data stored in the computing device, moving the data stored in the computing device to a location that is outside the computing device, to which the computing device does not have access.

2. The information privacy system of claim 1, wherein the location is a cloud storage.

3. The information privacy system of claim 1, wherein the software further includes instructions to cause the processing unit to perform the action of subsequently receiving the data from the cloud storage to restore the data at the computing device based at least on a determination that an authorized person is present in the environment.

4. The information privacy system of claim 1, wherein the determining that the at least one of the one or more parties present in the environment is not designated to access the data stored in the computing device is based at least on an occurrence of a particular point in time or time period.

5. The information privacy system of claim 1, wherein the software further includes instructions to cause the processing unit to perform the action of hiding a device or firmware of the computing device on which the data is stored from a list in the computing device.

6. A method for providing information privacy, comprising:
    monitoring a presence of one or more parties with respect to a computing device in an environment;
    determining that at least one of the one or more parties present in the environment is not designated to access data stored in the computing device; and
    in response to determining that the at least one of the one or more parties present in the environment is not designated to access the data stored in the computing device, moving the data stored in the computing device to a location that is outside the computing device, to which the computing device does not have access.

7. The method of claim 6, wherein the location is a cloud storage.

8. The method of claim 7, wherein the cloud storage is subsequently inaccessible by the computing device.

9. The method of claim 7, further comprising:
    receiving the data from the cloud storage to restore the data at the computing device based at least on a determination that an authorized person is present in the environment.

10. The method of claim 6, wherein the determining that the at least one of the one or more parties present in the environment is not designated to access the data stored in the computing device is based at least on an occurrence of a particular point in time or time period.

11. The method of claim 6, further comprising:
    hiding a device or firmware of the computing device on which the data is stored from a list in the computing device.

12. The method of claim 6, wherein the moving the data stored in the computing device comprises:
    copying the data to the location; and
    deleting the data from the computing device.

13. The information privacy system of claim 1, wherein the moving the data stored in the computing device comprises:
    copying the data to the location; and
    deleting the data from the computing device.

14. A computer program product comprising a computer-readable memory having computer program logic recorded thereon that, when executed by at least one processor, causes the at least one processor to perform the steps of:
    monitoring a presence of one or more parties with respect to a computing device in an environment;
    determining that at least one of the one or more parties present in the environment is not designated to access data stored in the computing device; and
    in response to determining that the at least one of the one or more parties present in the environment is not designated to access the data stored in the computing device, moving data stored in the computing device to a location that is outside the computing device, to which the computing device does not have access.

15. The computer program product of claim 14, wherein the location is a cloud storage.

16. The computer program product of claim 15, wherein the cloud storage is subsequently inaccessible by the computing device.

17. The computer program product of claim 15, wherein the steps further comprise:
    receiving the data from the cloud storage to restore the data at the computing device based at least on a determination that an authorized person is present in the environment.

18. The computer program product of claim 14, wherein the determining that the at least one of the one or more parties present in the environment is not designated to access the data stored in the computing device is based at least on an occurrence of a particular point in time or time period.

19. The computer program product of claim 14, wherein the steps further comprise:
    hiding a device or firmware of the computing device on which the data is stored from a list in the computing device.

20. The computer program product of claim 14, wherein the moving the data stored in the computing device comprises:
    copying the data to the location; and
    deleting the data from the computing device.

* * * * *